United States Patent [19]

Johnson

[11] 4,008,427

[45] Feb. 15, 1977

[54] VARIABLE INPUT POWER SUPPLY

[75] Inventor: Leopold J. Johnson, Escondido, Calif.

[73] Assignee: The United States of America as represented by the Secretary of the Navy, Washington, D.C.

[22] Filed: Sept. 29, 1975

[21] Appl. No.: 617,924

[52] U.S. Cl. .................................. 321/18; 307/82; 321/27 R

[51] Int. Cl.² ........................................ H02M 7/537

[58] Field of Search ................. 307/43, 60, 64, 82, 307/83; 321/2, 18, 27 R, 45 R; 323/17, 22 T, DIG. 1, 23, 25

[56] References Cited

UNITED STATES PATENTS

| | | | |
|---|---|---|---|
| 3,559,030 | 1/1971 | Bussard | 321/27 R |
| 3,668,509 | 6/1972 | Riebs et al. | 321/18 |
| 3,769,571 | 10/1973 | Wilkinson | 321/27 R |

*Primary Examiner*—A. D. Pellinen
*Attorney, Agent, or Firm*—R. S. Sciascia; G. J. Rubens

[57] ABSTRACT

An electronic power supply using pulse width modulated (PWM) voltage regulation provides a regulated output for a wide range of input voltages. Thus, the invention apparatus is very versatile and many different types of equipment may be interchangeably used with it. The apparatus employs a control switch to change the level of voltage regulation and the turns ratio of the primary winding of the power supply output transformer, thereby obtaining increased tolerance to input voltage change.

7 Claims, 3 Drawing Figures

VARIABLE INPUT POWER SUPPLY

BACKGROUND OF THE INVENTION

This invention pertains to power supplies and particularly to power supplies using PWM voltage regulation to obtain a regulated output over a range of input voltages.

A conventional power supply using PWM voltage regulation contains a voltage regulator which receives a DC input voltage and produces a series of voltage pulses. These pulses are applied to a filter to obtain a regulated DC voltage at the filter output. As power supply input voltage increases, regulator input increases and the time duration of the pulses decreases in order to maintain a constant DC voltage at the filter output. If the power supply input increases sufficiently, the pulses will have such short duration that the power supply will operate inefficiently and may introduce excessive radio frequency interference into a load connected to it. The range of input voltages the supply can be used with is thereby limited.

SUMMARY OF THE INVENTION

In the present invention, a power supply using PWM voltage regulation provides a regulated output over a widely expanded range of input voltages. The invention utilizes a plurality of filters, each of which has one of a plurality of power inverters connected to its output. Each inverter winding is wound around a common transformer, and control circuitry responsive to regulator input voltage $V_{in}$ is provided. For a given $V_{in}$ the control circuitry operates to apply the regulator pulses to a given one of the filters to obtain a regulated DC voltage $V_r$ at the given filter output and also to transfer power to the transformer through the inverter connected to the given filter. Inverter winding turns ratios are selected so that $V_r$ may be maintained at a selected constant level by reflecting variations in $V_r$ back through the windings to the regulator, which modulates the time duration of the pulses. The time duration $t_{on}$ of each pulse is $$t_{on} = K \frac{V_r}{V_{in}}$$

where K is a constant. There may be any number of filters, each providing a different regulated voltage $V_r$, and control circuitry is appropriately designed, so that for a wide range of regulator input $V_{in}$ the pulses will be applied to a given filter with a given level $V_r$ only when $V_{in}$ is in a subrange of its possible values such that $t_{on}/K$ will not be less than 1/10. Other windings around the common transformer couple power from the transformer to power supply output.

An object of the invention is to provide a power supply that can be used with a wide variety of voltage sources.

Another object is to decrease the numbers and kinds of power supplies which must be stocked in situations where space is limited and there are numerous different voltage sources, such as on a ship.

Other objects, advantages and novel features of the invention will become apparent from the following detailed description of the invention when considered in conjunction with the accompanying drawings.

DESCRIPTION OF THE PREFERRED EMBODIMENT

Figure 1:
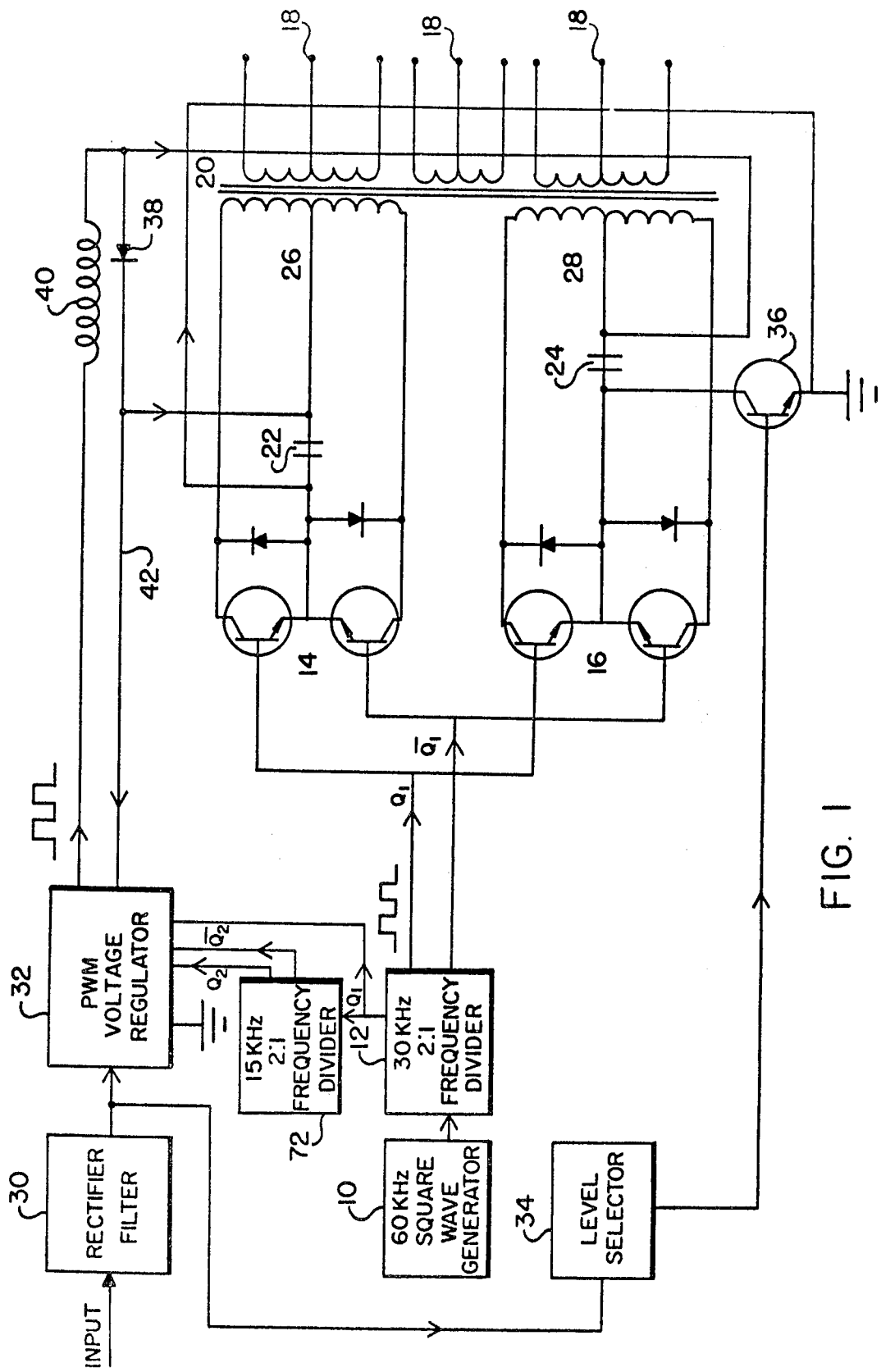
FIG. 1 is a schematic diagram illustrating an embodiment of the present invention.

Referring to FIG. 1 there is shown a square wave generator 10 which provides a train of square wave pulses to 2:1 frequency divider 12 which in turn provides 30 KHz square wave driving pulses to power inverters 14 and 16. Capacitor 22 is connected across the input of power inverter 14 and capacitor 24 is connected across the input of power inverter 16. Rectifier-filter 30 may have either a DC, single phase or three phase AC input voltage which may vary from 8-volts to 300-volts. The DC output of rectifier-filter 30 is fed to PWM voltage regulator 32 which produces a series of voltage pulses of modulated time duration. Level selector 34 is connected to the input of regulator 32 and operates in response to regulator input voltage to open or close transistor switch 36, thereby determining the level of regulation of the power supply.

When switch 36 is open, diode 38 is forward-biased and the output voltage pulses of regulator 32 are fed through inductor 40 and capacitor 22 to ground. Inductor 40 and capacitor 22 act as a filter which averages the pulses and produces a DC voltage of 40-volts across capacitor 22. Variations from 40-volts are fed back to regulator 32 through feedback loop 42 to cause regulator 32 to change the time duration of its output pulses to maintain a constant value of 40-volts across capacitor 22. This 40-volts provides an input to inverter 14 so that inverter winding 26 serves as primary winding of transformer 20, inducing a voltage in power supply output windings 18 and in inverter winding 28 through square wave transformer 20. Inverter winding 26 is provided with five times as many turns as inverter winding 28 so that the voltage induced in inverter winding 28 maintains a constant 8-volts across capacitor 24.

When switch 36 is closed capacitor 24 is connected to ground, diode 38 is back-biased and the output voltage pulses a regulator 32 are fed to inductor 40 and capacitor 24. Inductor 40 and capacitor 24 act as a filter and a DC voltage is produced across capacitor 24 which provides an input to inverter 16 so that inverter winding 28 serves as primary winding. If the voltage across capacitor 24 varies from 8-volts, a voltage equal to five times the variation is reflected back into inverter 14 through inverter winding 26 and the voltage across capacitor 22 changes from 40-volts. This reflected voltage is fed through feedback loop 42 to regulator 32 which changes the time duration of its output voltage pulses to maintain a constant 40-volts across capacitor 22 and consequently a constant 8-volts across capacitor 24.

For a regulator input of 0 to 55-volts, level selector 34 closes switch 36 and the power supply regulates at 8-volts. For a regulator input of 74 to 300-volts, level selector 34 opens switch 36 and the power supply regulates at 40-volts. For a regulator input of 55 to 74-volts, level selector 34 retains switch 36 in its previous state. This provision prevents continual change of level for a regulator input that varies slightly around a specific transition voltage.

A change from one level of regulation to the other is nearly instantaneous and generates no transients in the power supply. Switch 36 changes states instantaneously and causes the bias of diode 38 to change instantaneously. Consequently, the current through inductor 40, which may not change instantaneously, is provided with an alternate path as soon as a change in levels occurs. The voltages across capacitors 22 and 24 may not change instantaneously and therefore remain constant during the change. Since inverter winding 26 has five times as many turns as inverter winding 28 and since the square wave pulses driving inverter 14 and inverter 16 are in phase, voltages in output windings 18 are unaffected by a change in the inverter winding serving as primary. The voltage in each output winding 18 is a regulated square wave voltage of 30 KHz frequency and an amplitude dependent on the turns ratio of inverter windings 26 and 28 to each output winding 18. Each regulated output voltage may be applied to a rectifier filter network to obtain a DC voltage.

Figure 2:
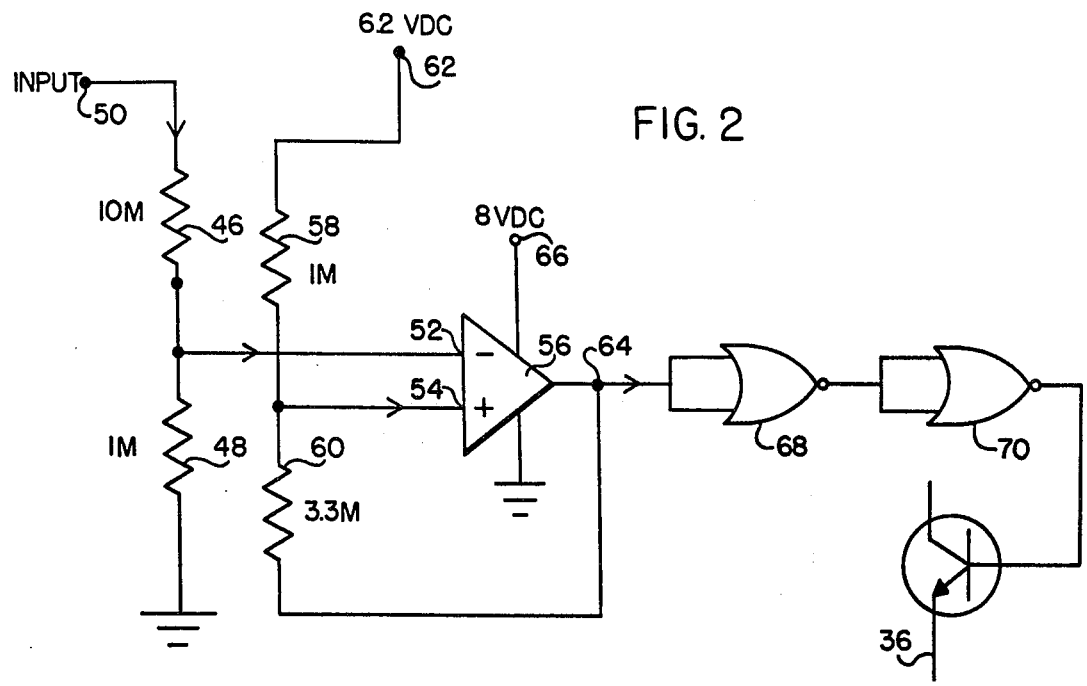
FIG. 2 is a schematic diagram illustrating a level selector for the embodiment of FIG. 1.

FIG. 2 shows a schematic diagram of a level selector wherein 10 megohm resistor 46 and one megohm resistor 48 are connected in series between level selector input terminal 50 and ground so that the voltage across resistor 48 is 1/11 of regulator input voltage and serves as the input to terminal 52 of operational amplifier 56 which is functioning as a switch responsive to two inputs. Resistor 58 and resistor 60 are connected in series between 6.2 VDC bias source 62 and amplifier 56 output terminal 64. When input voltage to terminal 52 is less than input voltage to terminal 54, amplifier 56 operates as a closed switch and amplifier output is 8-volts DC provided by 8-volt source 66. When input voltage to terminal 52 is greater than input voltage to terminal 54, amplifier 56 operates as an open switch and amplifier output is 0-volts. When amplifier output is 8-volts, input to terminal 54 is approximately 6.6-volts and when amplifier output is 0-volts input to terminal 54 is approximately 5-volts. Consequently, when regulator 32 input is less than 55-volts so that the input to terminal 52 is less than 5-volts, amplifier 56 output is 8-volts and input to terminal 54 is 6.6-volts. As regulator 32 input increases from 55-volts, amplifier 56 output remains 8-volts until regulator 32 input exceeds 74-volts and the input to terminal 52 exceeds 6.6-volts. When this occurs amplifier 56 output becomes 0-volts, the input to terminal 54 becomes 5-volts, and this condition will be maintained until regulator input falls below 55-volts.

When the output of amplifier 56 is 8-volts NAND gate 68 has a low output, NAND gate 70 has a high output, and switch 36 is closed. When the output of amplifier 56 is 0-volts the opposite occurs and switch 36 is open.

Figure 3:
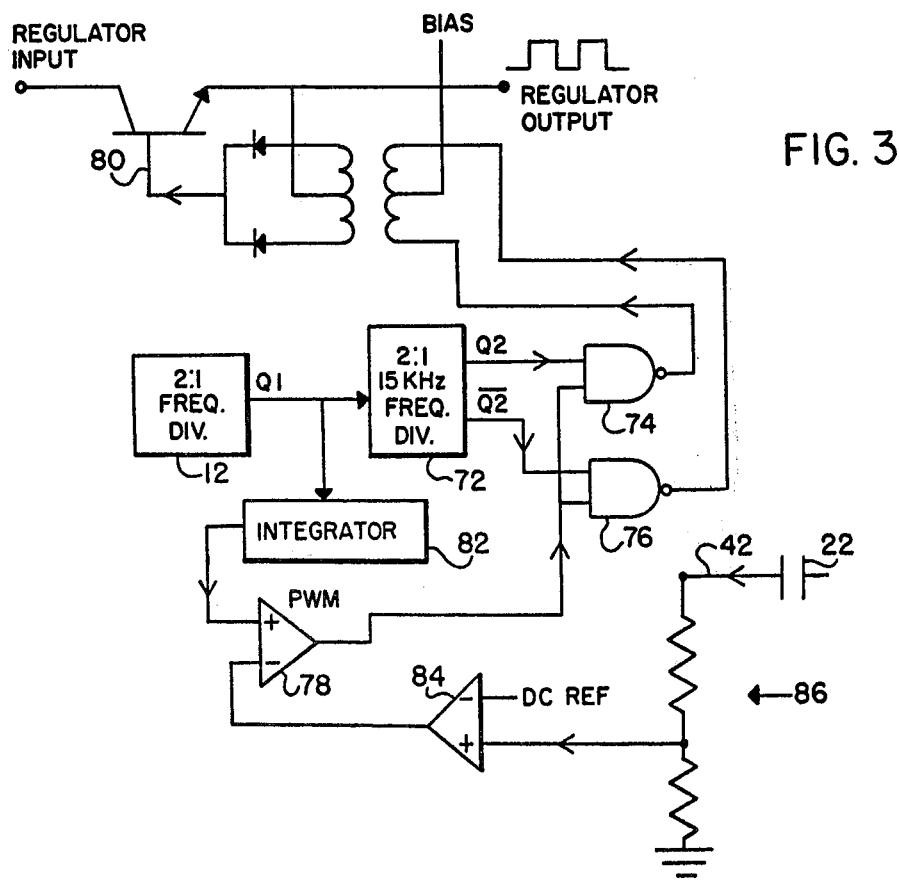
FIG. 3 is a schematic diagram illustrating a PWM voltage regulator for the embodiment of FIG. 1.

FIG. 3 shows a schematic diagram of a PWM voltage regulator wherein frequency divider 72 provides 15 KHz square wave voltage pulses 180° out of phase to NAND gates 74 and 76. When the output of operational amplifier 78 is positive NAND gates 74 and 76 are on for full alternate half periods of the 15 KHz waves so that there are no gaps in the rectified wave pulses applied to regulator switch 80. Consequently, regulator switch 80 remains on and the output of regulator 32 is a DC voltage equal to its input. If the output of operational amplifier 78 is 0 during part of a period, NAND gates 74 and 76 are not on for full half periods, regulator switch 80 is turned off for part of each period, and the output of regulator 32 is a series of pulses. The output of operational amplifier 78 is obtained by comparing a triangular wave reference with the output of operational amplifier 84. The output of amplifier 78 is positive when the triangular wave reference exceeds the output of operational amplifier 84 and is 0 when the triangular wave reference is less. The triangular wave reference is provided by integrating the 30 KHz square wave pulses of frequency divider 12 through integrator 82 to obtain a triangular wave with a positive DC component. The output of operational amplifier 84 is provided by comparing a DC reference with a feedback signal which is proportional to the voltage across capacitor 22 which is the voltage being regulated. Capacitor 22 is connected through feedback loop 42 to voltage divider 86. When the DC reference is higher than the feedback signal, the output of amplifier 84 is 0 and the output of amplifier 78 is positive. When the feedback signal is greater than the DC reference, the output of amplifier 34 is a positive voltage which increases as the difference between the feedback signal and the DC reference increases, and the minimum value of this positive voltage is greater than the minimum value of the triangular wave reference so that regulator switch 80 will be off for part of each period. If the feedback signal increases, amplifier 84 output increases so that the triangular wave reference exceeds amplifier 84 output for a lesser portion of each of its periods. Consequently, regulator switch 80 is turned on for a lesser portion of each period of its 15 KHz driving pulses and the output pulses of the regulator have shorter time duration.

Obviously many modifications and variations of the present invention are possible in the light of the above teachings. It is therefore to be understood that within the scope of the appended claims the invention may be practiced otherwise than as specifically described.

What is claimed is:

1. A power supply providing a regulated output voltage over a range of input voltages, said power supply comprising:
    a rectifier circuit means having input terminals for receiving AC and DC input voltages and producing a DC output voltage of constant polarity;
    a voltage regulator means connected to the output of said rectifier circuit means having a feedback input means for generating a series of voltage pulses wherein for a given voltage applied to said feedback input means, the time duration of each pulse is inversely proportional to said voltage regulator means input voltage;
    a plurality of filter means connected to the output of said voltage regulator means, each of said filter means having an output;
    sensing means connected to the input of said voltage regulator means for sensing variations in the input voltage to said voltage regulator means;
    control means connected to said sensing means and to each of said filter means for selectively coupling said series of voltage pulses to a given one of said filter means;
    feedback means connected from each of said outputs of said filter means to said feedback input means of said voltage regulator means;
    coupling means connected to each of said outputs of said filter means and to the output of said power supply for transferring power from each of said outputs of said filter means to said output of said power supply.

2. A power supply providing a regulated output voltage over a range of input voltages, said power supply comprising:
- a rectifier circuit means having input terminals for receiving AC and DC voltages and producing a DC output voltage of constant polarity;
- a voltage regulator means connected to the output of said rectifier means having a feedback input means for generating a series of voltage pulses wherein for a given voltage applied to said feedback input means, the time duration of each pulse is inversely proportional to said voltage regulator means input voltage;
- a plurality of filter means connected to the output of said voltage regulator means, each of said filter means having an output;
- a feedback means connected from the output of one of said filter means to said feedback input means of said voltage regulator means;
- a plurality of power inverter circuit means, the input of each of said power inverter circuit means connected to the output of one of said filter means, each of said power inverter circuit means having an inductive winding for providing an inductive output voltage in response to a voltage applied to said power inverter circuit means input;
- a first coupling means for inductively coupling said inductive windings of said power inverter circuit means;
- sensing means connected to the input of said voltage regulator means for sensing variations in the input voltage to said voltage regulator means;
- control means connected to said sensing means and to each of said filter means for selectively coupling said series of voltage pulses to a given one of said filter means whereby an input voltage is applied to the power inverter circuit means connected to said given one of said filters, a voltage is induced in the inductive winding of each of the other power inverter circuit means and a voltage is provided to the input of each of said other power inverter circuit means;
- a second coupling means for inductively coupling each of said inductive windings of said power inverter circuit means to the output of said power supply.

3. The power supply of claim 2 wherein the inductive winding of one of said power inverter circuit means comprises a selected number of turns and the inductive winding of each of the other of said power inverter circuit means comprises a number of turns equal to a multiple of said selected number of turns.

4. The power supply of claim 3 wherein each of said filter means comprises an inductor common to each of said filter means connected to the output of said voltage regulator means, a capacitor for each of said filter means connected to said inductor, and the output of each of said filter means is taken across its capacitor.

5. The power supply of claim 4 wherein there are two of said filter means and two of said power inverter circuit means.

6. The power supply of claim 5 wherein said control means comprises an electronic switch connected between ground and the capacitor of one of said filters and a diode connected between the capacitors of said filters.

7. The power supply of claim 6 wherein said sensing means is connected to said electronic switch for closing said electronic switch when said voltage regulator means input voltage is less than a first selected voltage, for opening said electronic switch when said voltage regulator means input voltage is greater than a second selected voltage which is greater than said first selected voltage, and for retaining said electronic switch in its previous state when said regulator means input voltage is between said first selected voltage and said second selected voltage.

* * * * *